Sept. 19, 1961      G. EGGERS ET AL      3,000,593
CARRIER AIRCRAFT HAVING AN ANNULAR WING
Filed May 27, 1958      8 Sheets-Sheet 1

Sept. 19, 1961 G. EGGERS ET AL 3,000,593
CARRIER AIRCRAFT HAVING AN ANNULAR WING
Filed May 27, 1958 8 Sheets-Sheet 2

Sept. 19, 1961 G. EGGERS ET AL 3,000,593
CARRIER AIRCRAFT HAVING AN ANNULAR WING
Filed May 27, 1958 8 Sheets-Sheet 3

Inventors
Gerhard Eggers &
Eric Halberkorn
By Watson, Cole, Grindle & Watson
Attorneys

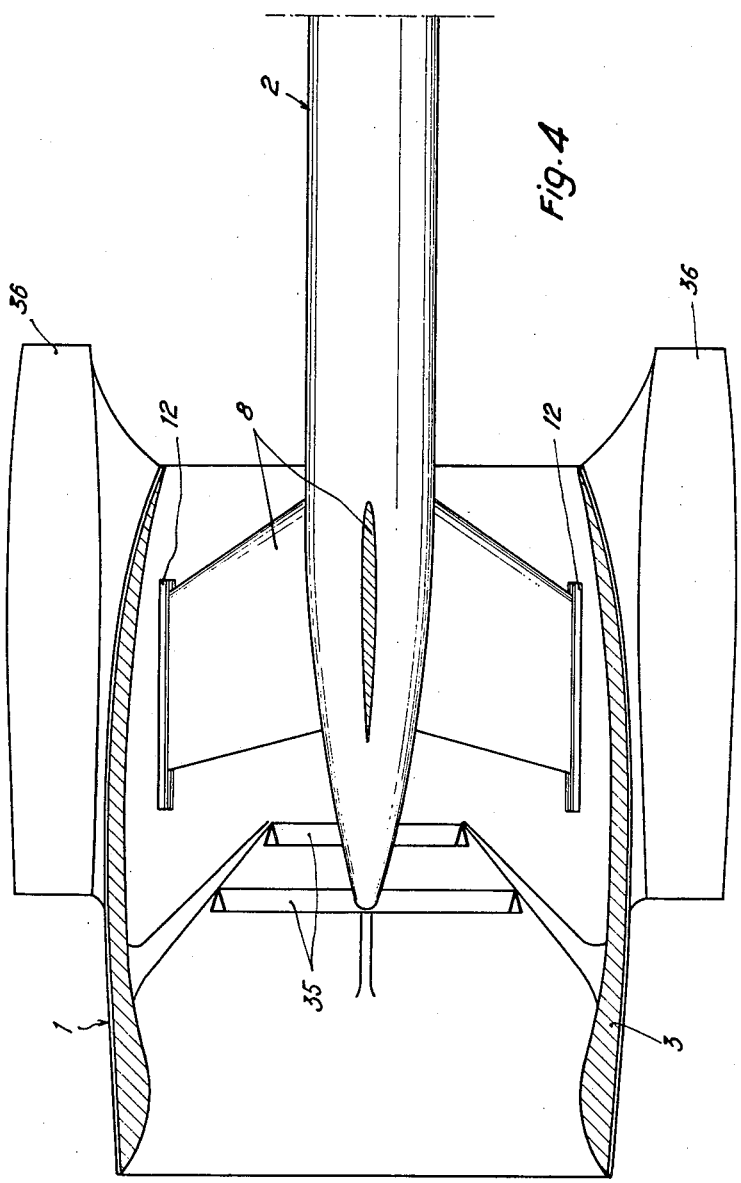

Sept. 19, 1961    G. EGGERS ET AL    3,000,593
CARRIER AIRCRAFT HAVING AN ANNULAR WING
Filed May 27, 1958    8 Sheets-Sheet 6

Sept. 19, 1961 G. EGGERS ET AL 3,000,593
CARRIER AIRCRAFT HAVING AN ANNULAR WING
Filed May 27, 1958 8 Sheets-Sheet 7

United States Patent Office 3,000,593
Patented Sept. 19, 1961

3,000,593
CARRIER AIRCRAFT HAVING AN ANNULAR WING
Gerhard Eggers, Dammarie les Lys, France, and Erich Haberkorn, Stuttgart-Bernhausen, Germany, assignors to Societe Nationale d'Etude et de Construction de Moteurs d'Aviation, Paris, France, a French company
Filed May 27, 1958, Ser. No. 738,149
Claims priority, application France June 18, 1957
4 Claims. (Cl. 244—2)

The present invention relates to an aircraft to be used as a carrier vehicle. More particularly, this aircraft may be resorted to for bringing a high-performance aerodyne to the required speed and altitude and then releasing the same. The carrier aircraft may also be used as a flying test bench for aeronautical engines or other parts, or still as a vehicle for releasable loads.

In the following description and claims, the term "carried craft" will be used to design, in its most general meaning, the load of the carrier aircraft, e.g. an aerodyne, an engine, a missile, a container, etc.

The main object of the present invention is to provide a V.T.O.L. annular wing carrier aircraft designed for housing the carried craft or part of it, within the annular wing. To this end, the power plant of the carrier aircraft is arranged peripherally on the annular wing, leaving its inner volume free for accommodating the carried craft.

Another object of this invention is to provide such a carrier aircraft with support means, on the inner surface of the annular wing, for longitudinally guiding the carried craft, for relative displacement parallel to the longitudinal axis of the annular wing.

Still another object of this invention is to so arrange the support means of the carried craft in the annular wing, that the longitudinal axes of both the carrier aircraft and the carried craft substantially coincide.

The following description with reference to the accompanying drawings will make clear the various features of the invention and the manner in which the same are to be carried out.

FIGURE 4 is a similar section, on a larger scale, showing a modification.

Figure 1:
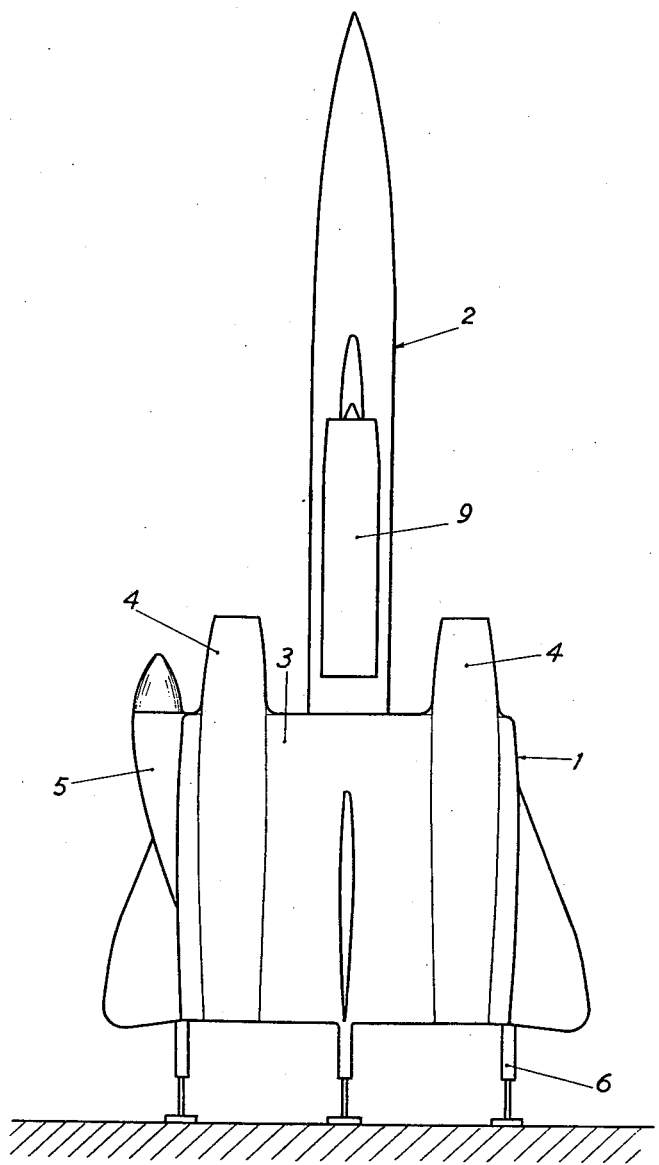
FIGURE 1 is a side elevation of a composite aircraft according to the invention, resting vertically on the ground in a position ready for take-off.
Figure 2:
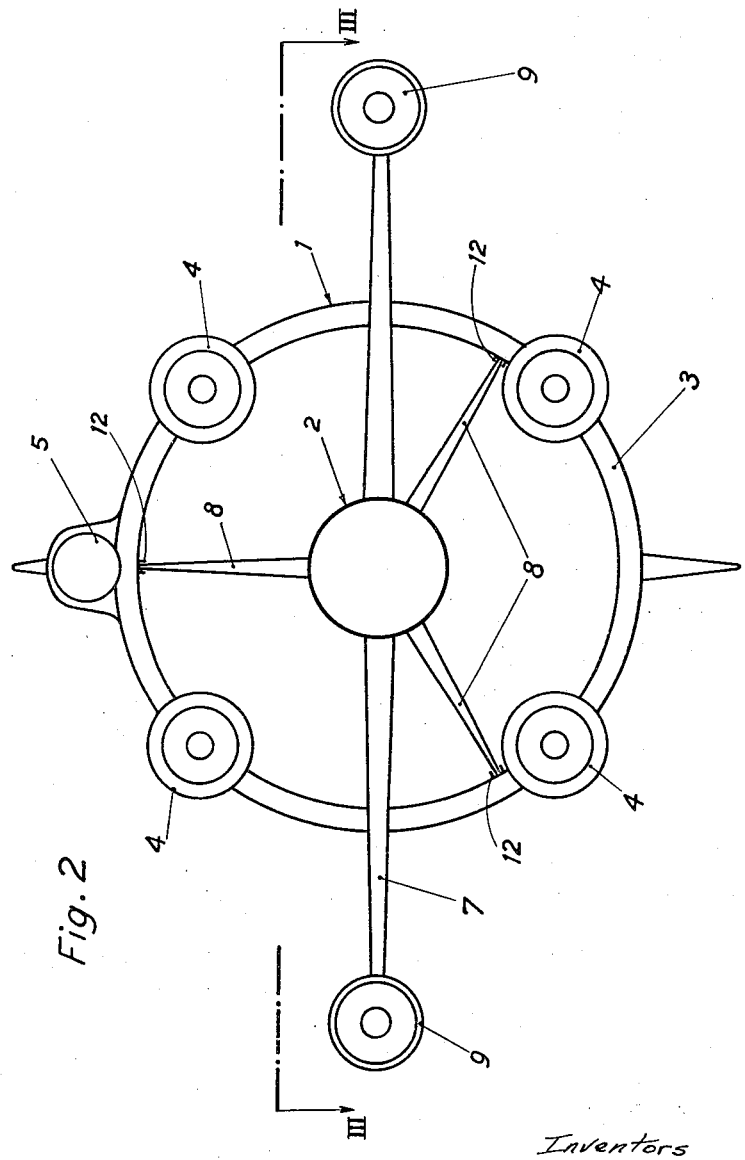
FIGURE 2 is a front end view of this aircraft.
Figure 3:
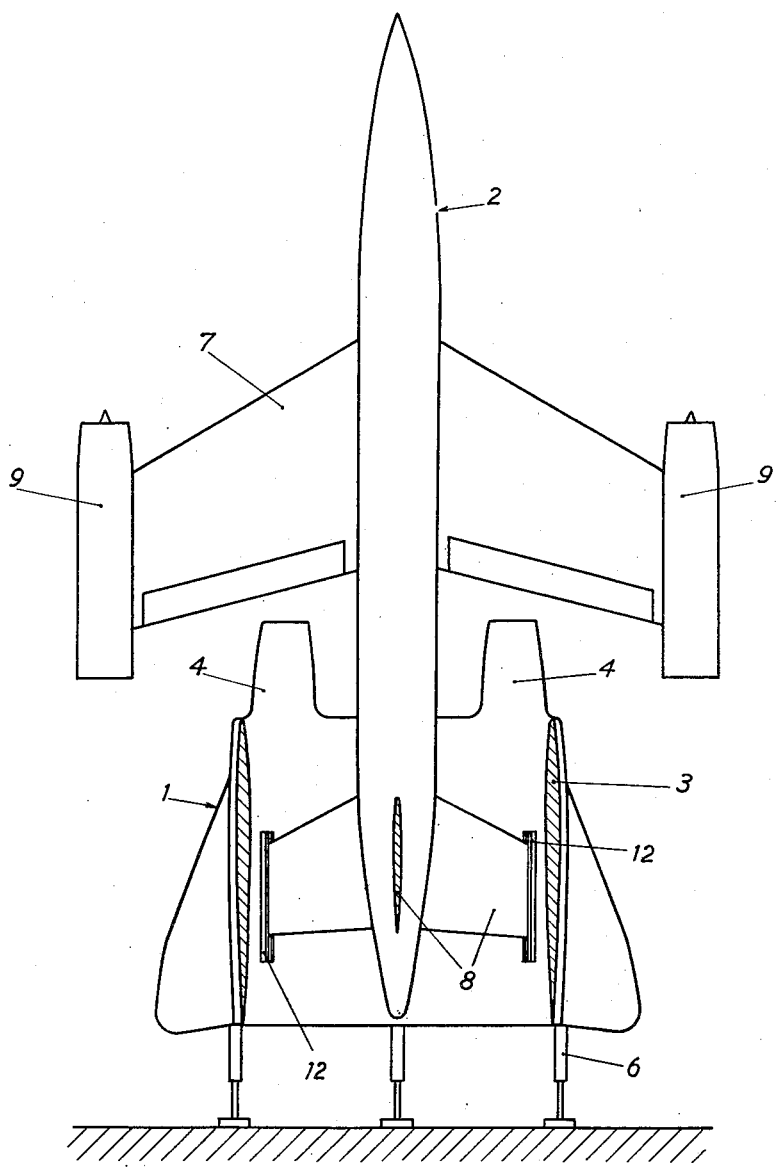
FIGURE 3 is a section taken along line III—III of FIGURE 2.

The composite aircraft illustrated in FIGURES 1 to 3 comprises two separate main components each forming a complete craft, which are integrated into a unit by a system of connection described hereafter.

The first or carrier component 1 is provided with an annular wing 3 and is propelled by turbo-jet engines 4 which are distributed symmetrically around the wing (in this embodiment the jet propulsion engines are partly embedded in the wing but they may likewise be housed in nacelles fitted on the outside of the wing).

This carrier is provided with known control and stabilising means which allow it to take-off and to land vertically, and to fly with or without the second component.

A cabin 5 attached above or below the carrier (in the position of horizontal flight) encloses the pilot's cockpit. Its protruding position permits an ejectable cabin device or interchangeable cabins.

The carrier rests on the ground on legs 6 mounted on shock absorbers; these legs are provided with disc plates but may alternatively be provided with rollers to facilitate handling.

The carried craft 2 is an aeroplane having a swept-back wing 7, a tailplane 8 composed of three equal fins at 120° to each other around the fuselage. It is propelled by two ram jet engines 9 fitted at the wing tips, and is provided with conventional control means for driving stabilisation and radio-control, which allow it to fulfill a mission after having started a flight on its own. It may alternatively be provided with a pilot's cockpit, if desired.

The symmetrical disposition of the jet propulsion engines 4 of the carrier 1 with respect to its longitudinal axis, and the position of the aeroplane 2, the longitudinal axis of which coincides with that of the carrier help to provide good stability at vertical take-off, the centers of gravity of the carrier and of the aeroplane being then located practically on the same vertical axis which is also the axis of symmetry of the carrier.

After take-off, when the composite aircraft has reached sufficient height, it can assume horizontal flight. At this moment the annular wing 3 of the carrier and the wing 7 of the aeroplane both contribute to the lift of the composite aircraft.

In order to increase the velocity and altitude of the composite aircraft at which the release of the aeroplane is to be carried out, the thrust of the carrier may be increased by providing the same with a ram jet propulsion engine the combustion chamber of which is bounded by the inner wall surface of the annular wing 3. As shown in FIGURE 4, downstream of the fins 8 of the tailplane of the aeroplane 2 one or more annular sets 35 provided with fuel injectors and flame holders are arranged in such a manner that the flames do not impinge on the inner wall surface of the annular wing 3.

Figure 6:
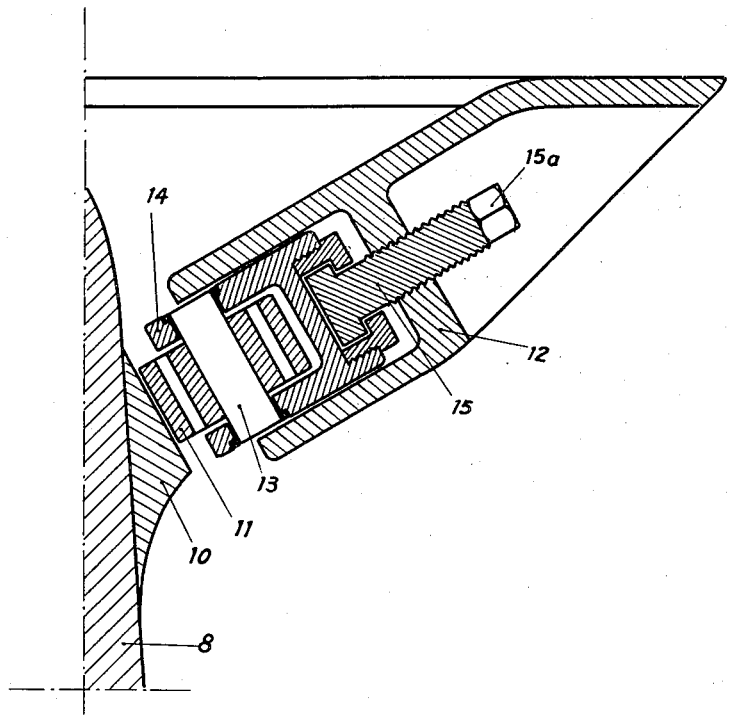
FIGURES 5 and 6 show details of a particular system of connection between the carrier aircraft and the carried craft.
Figure 5:
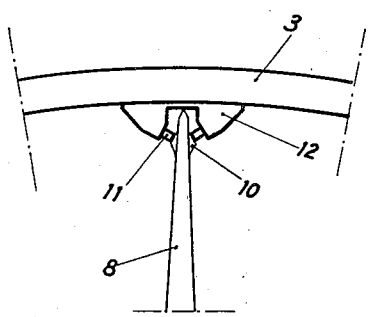

The connection between the carrier and the aeroplane, details of which are illustrated in FIGURES 5 and 6, is effected by means of the tailplane 8 which is provided with a sufficiently strong inner structure.

The marginal edge of each of the fins of the tailplane is provided on both sides with a slide track 10 on which bear rollers 11 fixedly journalled on a slider bracket 12 fitted in the longitudinal direction on the inner wall surface of the annular wing 3. The distribution of the rollers is such that whatever may be the position of the tailplane along the slide track, there are always at least three rollers in contact with each slide track 10.

Each roller 11 is mounted on a needle or roller bearing, and is fixedly attached with its axle 13 on a thimble 14 the distance of which from the slide track 10 may be varied by means of a screw-threaded rod 15 provided with a square head 15a.

Figure 7:
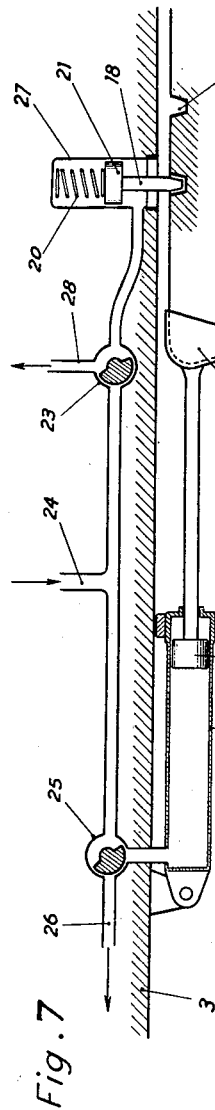
FIGURES 7 and 8 show a device associated with the preceding system of connection in order to adjust the position of the center of gravity of the composite aircraft.

Each of the aft ends of the fins 8 engages on an abutment 16 (FIGURE 7) the longitudinal position of which can be adjusted by the action of a jack 17. The thrust of the carrier on the aeroplane by the abutments 16 and the reaction of the drag of the latter on these abutments contribute to keep the aeroplane locked on the carrier.

Nevertheless means may be provided for locking the aeroplane on the carrier. These locking means may be constituted for example by a system of pins mounted in the annular wing 3. A pin 18 engages under the action of a spring 20 one of a number of recesses 19 provided along the edge of the fins 8 of the empennage (in this FIGURE 7 the slide track and rollers are not shown).

Unlocking is effected by operating a three-way cock 23 in such a manner as to feed pressure oil from a line 24 into the cylinder 27, thus urging the piston 21 inwardly against the action of spring 20. The pin 18 which is integral with the piston 21 is thereby withdrawn from the recess 19 in which it had been engaged. Locking is likewise effected by operating the cock 23, in such a manner that the oil trapped in the cylinder 27 may escape through a return line 28 under the action of the spring 20 and the piston 21.

In order to slide the aeroplane back with respect to the carrier, a cock 25 is operated in such a manner as to permit the oil contained in the jack 17 to escape through the return line 26 under the action exerted by the piston 29 which transmit all the forces arising from the drag of the aeroplane. On the other hand, in order to slide the aeroplane forward with respect to the carrier, the cock 25 is operated to feed oil under pressure from the line 24 into the jack 17.

The arrangement described hereinabove which permits the adjustment of the relative position of the carrier and the aeroplane along the longitudinal axis of the composite aircraft is of particular importance at high velocities of flight. In fact, beyond a certain velocity, the center of pressure common to the assembly begins to recede, generating a pitching moment difficult to overcome with only the controls of the carrier. The connection described between the latter and the aeroplane permits the adjustment of the center of gravity of the assembly by varying the spacing between the center of gravity of the carrier and that of the aeroplane in such a manner that the centre of gravity of the assembly is always substantially aft of the centre of pressure thus assuring stability in horizontal flight.

Figure 8:
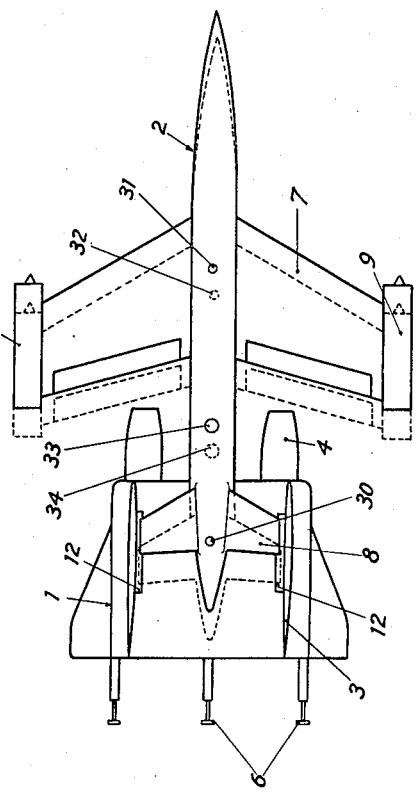

FIGURE 8 shows in full lines the extreme forward position of the machine 2, and in dotted lines its extreme aft position. The position of the center of gravity 30 of the carrier 1 remains practically unchanged during these relative movements, whereas the center of gravity of the aeroplane may assume any position between the extreme positions 31 and 32. Hence the center of gravity common to the two components may assume any position between 33 and 34.

Figure 9:
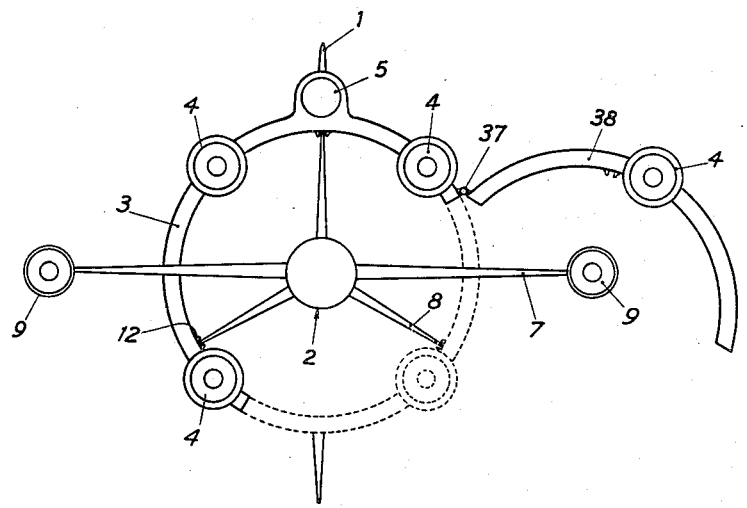
FIGURES 9 and 10 show a particular arrangement of the carrier aircraft designed to facilitate mounting of the carried craft.
Figure 10:
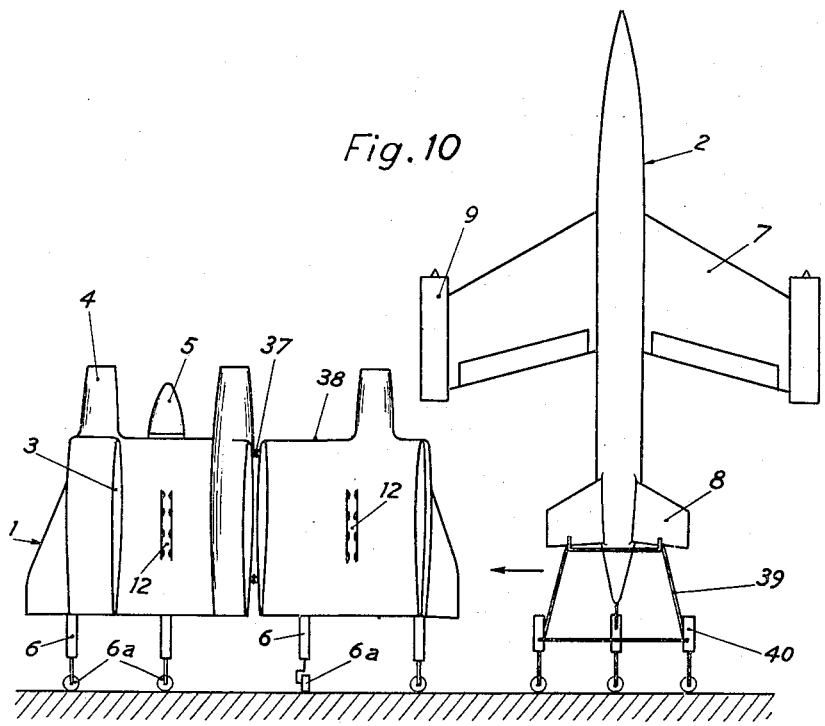

FIGURES 9 and 10 show a particular arrangement of the carrier, according to which a part 38 of the annular wing 3 can be opened about hinges 37, in order to leave a passage sufficiently wide for the tailplane 8 of the aeroplane 2 to pass therethrough to the interior of the annular wing and to be placed on the abutments 16 (FIGURE 8). The ground equipment is then reduced to a simple carriage 39. In order to detach the latter, the jacks 17 are operated so as to raise the aeroplane, or alternatively jacks 40 are provided on the carriage in order to lower the latter.

The legs 6 provided with rollers 6a, by which the carrier rests on the ground, are distributed over the two parts of the carrier in such a manner that the assembly is always in a stable equilibrium.

The locking of the movable portion 38 on the stationary portion may be effected in any suitable manner.

Figure 11:
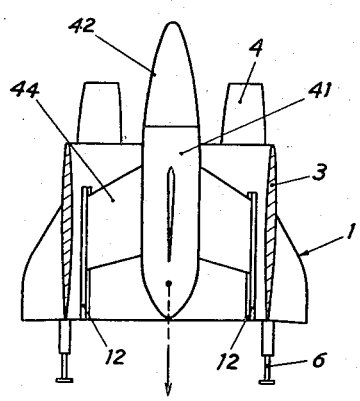
FIGURES 11 and 12 show a particular application of the carrier aircraft for the transport of loads designed to be released or laid on the ground.
Figure 12:
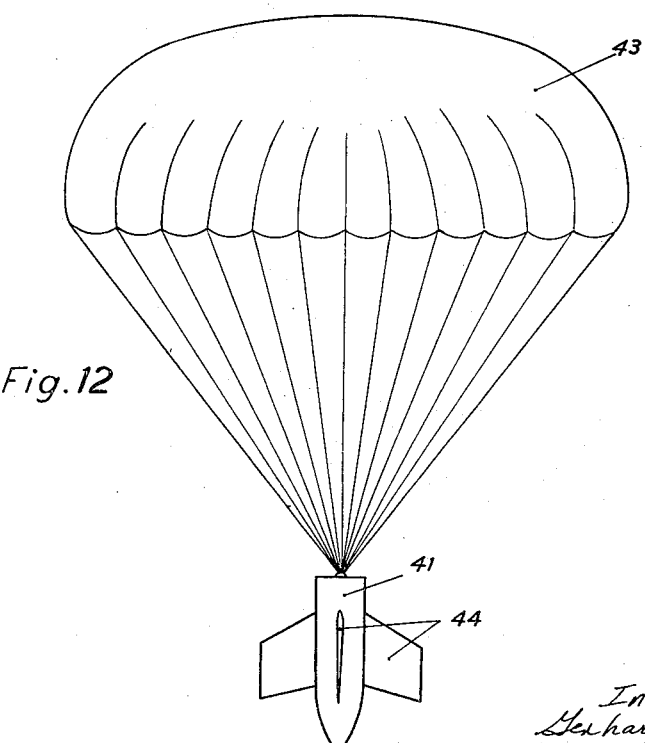

FIGURES 11 and 12 show how a carrier may be used for carrying a container 41, and for parachuting the same in vertical flight.

The connection between the two components is effected by fins 44 of the container and by a system of slide tracks 12 similar to that described hereinabove. The slide tracks in this case extend right to the trailing edge of the annular wing 3 in such a manner as to guide the container at the moment of release. A locking system keeps the container in such a position that its center of gravity coincides with the center of gravity of the carrier. Since this center of gravity is on the axis of symmetry of the carrier, the latter will not be thrown out of equilibrium at the moment of release. After the release, cap 42 detaches itself and allows the parachute 43 to open.

Likewise one may use the carrier for transporting and releasing loads not provided with parachute or for laying fragile loads.

What we claim is:

1. A composite flying machine comprising a carrier aircraft and a carried craft detachably secured thereto, said carrier aircraft comprising an annular aerofoil, slideways extending substantially along generatrices of the inner surface of said annular aerofoil in a fore-and-aft direction, said slide-ways being adapted to slidably engage and support rim portions of said carried craft whereby the latter is at least partly accommodated within said annular aerofoil, and a power plant and cabin arranged peripherally with respect to said annular aerofoil whereby the inner space thereof is left free and available for housing therein said carried craft.

2. Composite flying machine as claimed in claim 1, wherein the carrier aircraft comprises further abutments cooperatively associated with the slide-ways for rearwardly limiting displacement therealong of the carried craft, said abutments being longitudinally displaceable relatively to the annular aerofoil whereby the relative position of the carrier aircraft and carried craft is adjustable.

3. Composite flying machine as claimed in claim 1, wherein the annular aerofoil of the carrier aircraft is formed of two portions hinged to one another about an axis substantially parallel to the axis of said annular aerofoil.

4. Composite flying machine as claimed in claim 1, wherein the carried craft comprises at least three, equiangularly spaced tail planes having rectilinear rims parallel to the axis of the annular aerofoil of the carrier aircraft, said rims slidably engaging the slide-ways formed on the inner surface of said aerofoil.

References Cited in the file of this patent

UNITED STATES PATENTS

| | | |
|---|---|---|
| 2,421,742 | Buettner | June 10, 1947 |
| 2,585,030 | Nosker | Feb. 12, 1952 |
| 2,591,867 | Prower et al. | Apr. 8, 1952 |
| 2,621,000 | Robert | Dec. 9, 1952 |
| 2,712,421 | Naumann | July 5, 1955 |
| 2,907,536 | Zborowski | Oct. 6, 1959 |